United States Patent [19]
Takebayashi et al.

[11] Patent Number: 5,794,194
[45] Date of Patent: Aug. 11, 1998

[54] WORD SPOTTING IN A VARIABLE NOISE LEVEL ENVIRONMENT

[75] Inventors: Yoichi Takebayashi, Yokohama; Hiroyuki Tsuboi, Kobe; Hiroshi Kanazawa, Ebina, all of Japan

[73] Assignee: Kabushiki Kaisha Toshiba, Kawasaki, Japan

[21] Appl. No.: 794,770

[22] Filed: Feb. 3, 1997

Related U.S. Application Data

[63] Continuation of Ser. No. 103,235, Aug. 9, 1993, abandoned, which is a continuation-in-part of Ser. No. 617,792, Nov. 26, 1990, abandoned.

[30] Foreign Application Priority Data

Nov. 28, 1989 [JP] Japan ................................. 1-306477

[51] Int. Cl.$^6$ ........................... G10L 5/06; G10L 7/08
[52] U.S. Cl. ............................... 704/251; 704/253
[58] Field of Search ................... 395/2, 2.14, 2.42, 395/2.48, 2.6, 2.62, 2.63; 381/41–43, 46, 47; 704/200, 205, 233, 239, 251, 253, 252, 254

[56] References Cited

U.S. PATENT DOCUMENTS

| | | | |
|---|---|---|---|
| 4,625,287 | 11/1986 | Matsuura et al. | 395/2.63 |
| 4,720,802 | 1/1988 | Damoulakis et al. | 395/2.42 |
| 4,783,802 | 11/1988 | Takebayashi et al. | 395/2.42 |
| 4,856,067 | 8/1989 | Yamada et al. | 381/43 |
| 4,882,755 | 11/1989 | Yamada et al. | 395/2.48 |
| 4,937,871 | 6/1990 | Hattori | 395/2.42 |
| 4,985,924 | 1/1991 | Matsuura et al. | 395/2.63 |
| 5,023,911 | 6/1991 | Gerson | 395/2.62 |

OTHER PUBLICATIONS

Keyword–Spotting in Noisy Continuous Speech Using Word Pattern Vector Subabstrction and Noise Immunity Learning, Yoichi Takebayashi, et al. ICASSP, 1992, pp. 85–88.

A Consideration of Learning in Speech Recognition From the Viewpoint of A1 Class–Description Learning, pp. 705–713, Yoichi Takebayashi Proceedings of the 21st Hawaii International Conference on System Sciences, Jan. 5–8, 1988.

A Speaker Independent Recognition Algorithm for Connected Word Using Word Boundary Hypothesizer, Teruhiko Ukita, et al. ICASSP Proceedings 1986, Apr. 7–11, 1986, pp. 21.4.1–21.4.4.

Speaker–Adaptive Connected Syllable Recognition Based on the Multiple Similarity Method, Hiroyuki Tsuboi, et al. ICASSP 1986 Proceedings, Apr. 7–11, 1986, pp. 49.8.1–49.8.4.

Telephone Speech Recognition Using a Hybrid Method, Yoichi Takebayashi, et al. IEEE 7th International Conference on Pattern Recognition Proceedings Jul. 30–Aug. 2, 1984, pp. 1232–1235.

*Primary Examiner*—David D. Knepper
*Attorney, Agent, or Firm*—Oblon, Spivak, McClelland, Maier & Neustadt, P.C.

[57] ABSTRACT

Low- and high-dimensional feature parameters are obtained by analyzing a speech pattern to be recognized. A word spotting section extracts a plurality of approximate word feature vector candidates representing word features from the low-dimensional feature parameter without fixing word boundaries. Start and end points are detected for each of the word feature vector candidates. Detail word feature vector candidates are extracted from the high-dimensional feature parameter in accordance with the detected start and end points. A recognition dictionary stores reference patterns with which the detail word feature vector candidates are matched. A pattern matching section calculates similarity values between each of the detail word feature vector candidates and the reference patterns stored in the recognition dictionary. A recognition result selects reference patterns stored in the recognition dictionary when its similarity value is greater than a prescribed threshold value.

12 Claims, 11 Drawing Sheets

WORD SPOTTING IN A VARIABLE NOISE LEVEL ENVIRONMENT

CROSS-REFERENCES TO THE RELATED APPLICATIONS

This application is a Continuation of application Ser. No. 08/103,235, filed on Aug. 9, 1993, now abandoned, which is a Continuation-In-Part of application Ser. No. 07/617,792 filed Nov. 26, 1990, now abandoned.

BACKGROUND OF THE INVENTION

1. Field of the Invention

The present invention relates to an apparatus for recognizing time series signals such as human speeches and other acoustic signals.

2. Description of the Related Art

Conventionally, a time series signal recognition such as a speech pattern recognition has been achieved basically by first performing a so called segmentation process, in which a word boundary consisting of start and end points is detected in the time series signals, and then looking for a match between a reference pattern in a speech pattern recognition dictionary and a word feature vector extracted from the signal within the detected word boundary. There are several speech pattern recognition methods within this category of the prior art, including DP (Dynamic Programming) matching, HMM (Hidden Markov Model) and Multiple Similarity (partial space) method.

However, in more realistic environments with noises, there has been a problem in practice since recognition errors can occur due to failure in appropriate word boundary detection, as well as due to false pattern matching.

More specifically, the detection of the word boundary has conventionally been performed with energy or pitch frequency of a time series signal as a parameter, so although highly accurate recognition tests can be performed in a quiet experiment room, the recognition rate drastically decreases in real-world environments, such as those in offices, cars, stations, or factories.

To cope with this problem, there has been a proposition of a speech pattern recognition method called a "word spotting (continuous pattern matching) method" wherein the word boundary is taken not to be fixed but variable. However, this method is associated with another kind of problems as described below.

Figure 1:
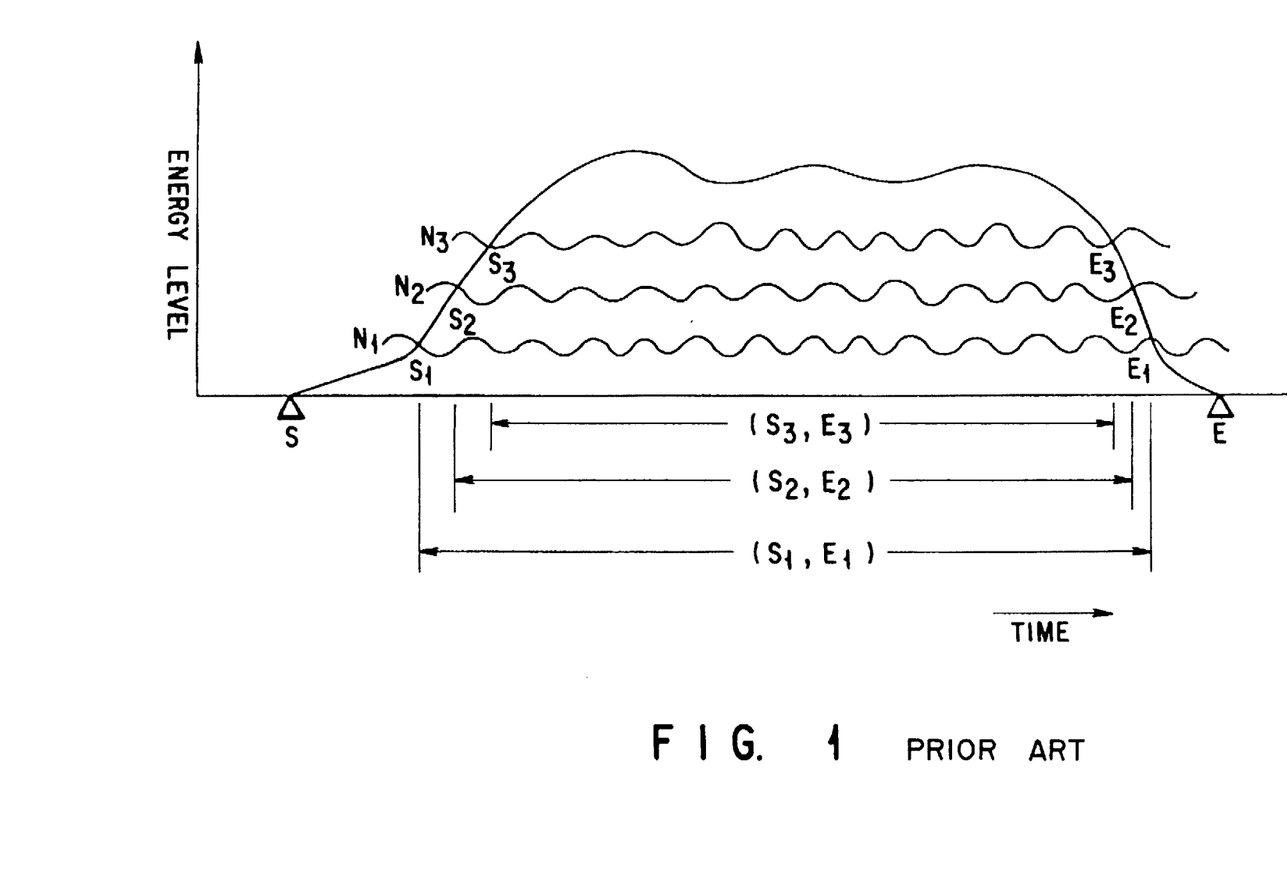
FIG. 1 is a diagram showing an example of time series for an energy of a signal which is depicted along with indications for three different noise levels.

As shown in FIG. 1, the word boundary for the time series signal progressively becomes narrower as the noise level increases from $N_1$ to $N_2$ and to $N_3$, and is indicated by the intervals $(S_1, E_1)$, $(S_2, E_2)$, and $(S_3, E_3)$, respectively. However, the speech pattern recognition dictionary is usually prepared by using the word feature vectors obtained by using the specific word boundaries and the specific noise levels. When such a conventional speech pattern recognition dictionary is used with the word spotting method, the matching of the above dictionary with the word feature vectors obtained from non-fixed word boundaries for a speech with noise and a low Signal-to-Noise Ratio (SNR) becomes difficult. Many recognition errors have occurred for this reason.

Also, since similarity calculation must be performed for each of a number of word feature vectors and reference patterns stored in a speech pattern recognition dictionary, the word spotting method requires much more time than in the conventional method.

Further, where a speech pattern recognition system for performing the word spotting method in real time is developed, the hardware is large and the manufacturing cost extremely high. For this reason, when the word spotting method is applied in the speech pattern recognition system, the dimensional size of the word feature vector should be small. When the dimensional size of the word feature vector is reduced, the approximate structure of the word feature vector can be represented, but not its detail structure. As a consequence, accurate recognition of the word feature vector cannot be accomplished.

On the other hand, since the conventional speech pattern recognition method using a fixed word boundary performs similarity calculation using only a few word feature vectors, the dimensional size of the word feature vector can be set sufficiently large to obtain a high recognition accuracy. However, this conventional speech pattern recognition method has a fatal drawback wherein if an error is made in detecting word boundaries, the extracted word feature vectors will result in recognition error. Hence, this method can hardly be employed in noisy environments.

SUMMARY OF THE INVENTION

It is an object of the present invention to provide a speech pattern recognition system capable of obtaining a high recognition rate even in noisy or adverse environments in which the signals are subjected to rather large variations.

According to the present invention, there is a speech pattern recognition system including a speech analysis unit for obtaining a time series signal corresponding to a speech pattern to be recognized, and a speech pattern recognition unit for recognizing the time series signal. The speech pattern recognition unit includes a first extracting section for extracting a plurality of candidates of approximate word feature vectors characterizing word feature patterns from the time series signal, in accordance with a word-spotting method without fixing word boundaries. A section for detecting start and end points of each of the candidates of approximate word feature vectors. A second extraction section for extracting candidates of detail word feature vectors from the time series signal, in accordance with the detected start and end points. A recognition dictionary section stores reference patterns with which the candidates of detail word feature vectors are matched and a calculator calculates similarity values for each of the candidates of detail word feature vectors and for the reference patterns stored in the recognition dictionary section. A selector chooses reference patterns stored in the recognition dictionary section, when the similarity value calculated by the calculator is greater than a prescribed threshold value, in order to determining a recognition result.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will now be described with reference to the accompanying drawings.

Figure 2:
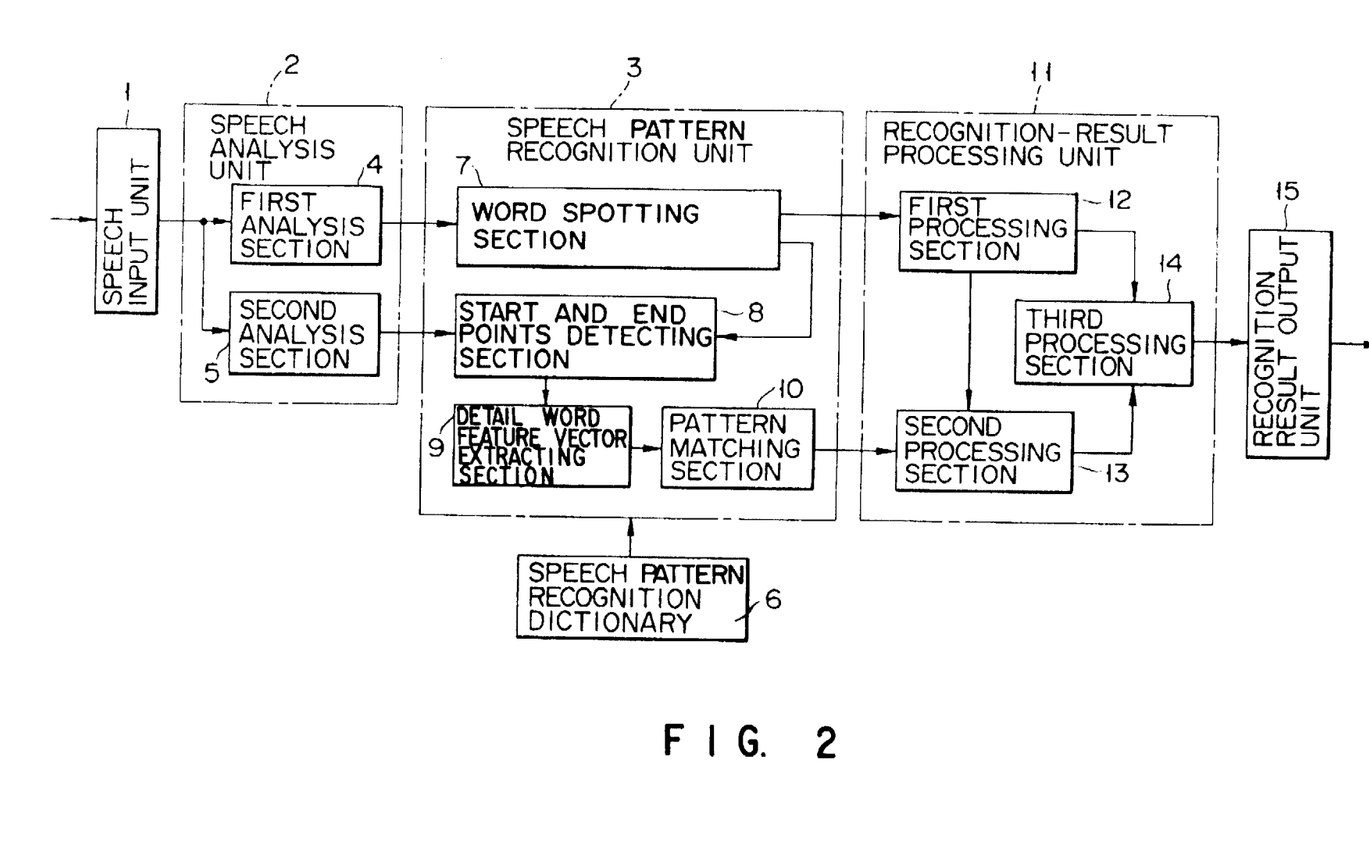
FIG. 2 is a block diagram illustrating a speech pattern recognition system according to an embodiment of the present invention.

FIG. 2 schematically illustrates a speech pattern recognition system according to the present invention. The system comprises a speech input unit 1, a speech analysis unit 2, a recognition-result processing unit 11, and a recognition result output unit 15.

The speech input unit 1 receives a time series signal, e.g., a speech signal supplied from a microphone (not shown), converts this signal into a digital time series signal, and supplies it to the speech analysis unit 2.

Figure 3:
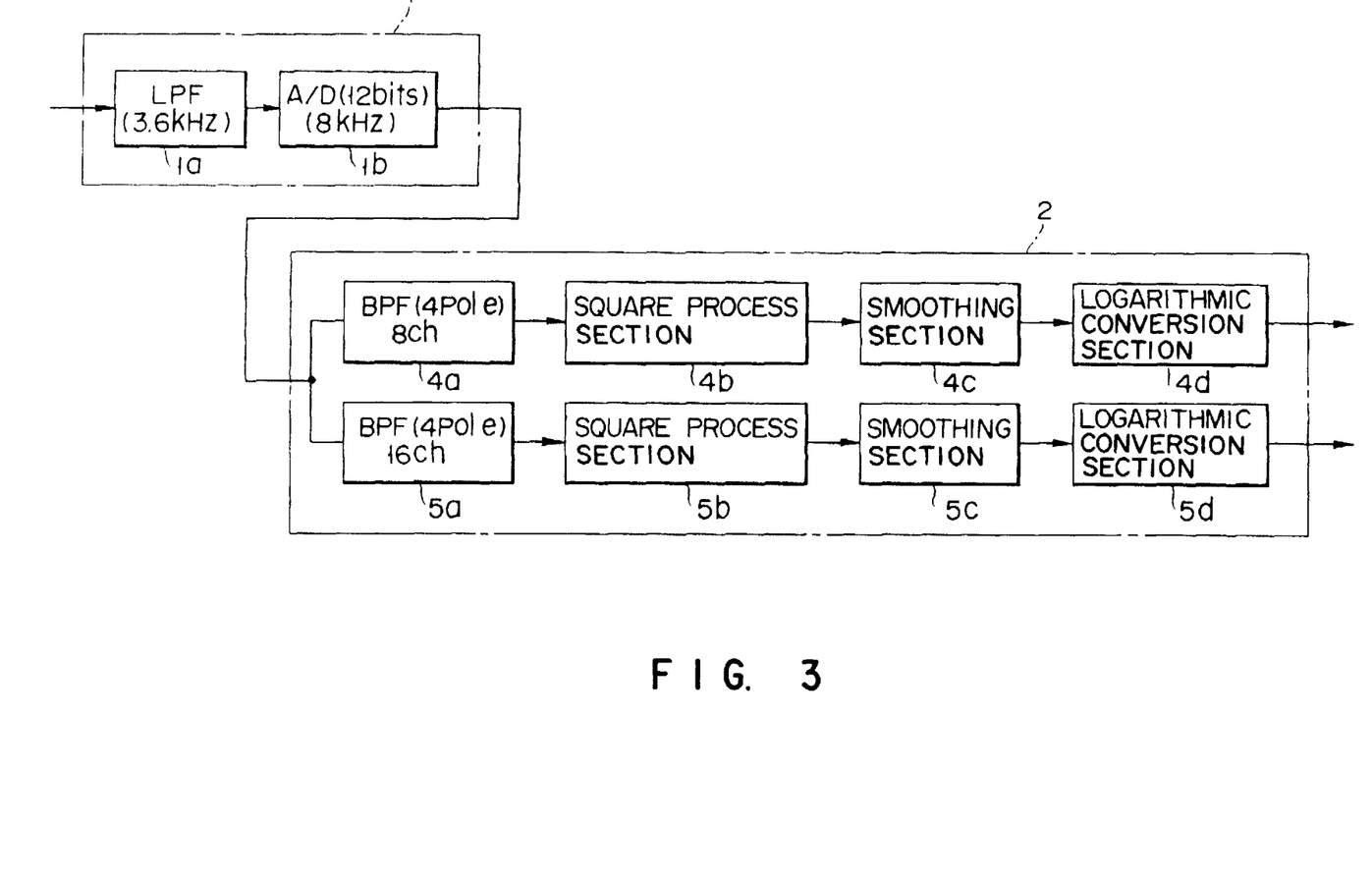
FIG. 3 is a block diagram showing the speech input unit and the speech analysis unit incorporated in the system shown in FIG. 2.

The speech input unit 1 comprises a low-pass filter (LPF) 1a, and an A/D converter 1b as shown in FIG. 3. The low-pass filter 1a removes high-frequency noise components having frequency of 3.6 kHz or more from the input speech signal. The A/D converter 1b samples the analog speech signal at a sampling frequency of 8 kHz and a quantization bit number of 12 bits, thereby converting the speech signal output from the low-pass filter 1a into a digital time series signal, i.e., a digital speech signal.

The A/D converter 1b can be designed to sample the analog speech signal at a sampling frequency of 12 kHz and a quantization bit number of 16 bits. The specification of the A/D converter 1b is determined according to the recognition accuracy required for recognizing the input speech.

The speech analysis unit 2 is designed to analyze the digital speech signal output from the speech input unit 1. More specifically, it performs various analyses, i.e., DFT (Discrete Fourier Transform) analysis, LPC (Linear Predictive Coding) analysis, and filter analysis, thereby to obtain a feature parameter every 8 msec from the digital speech signal. The feature parameter thus obtained is supplied to the speech pattern recognition unit 3.

The speech analysis unit 2 comprises a first analysis section, i.e., a low-dimensional analysis section 4 and a second analysis section, i.e., a high-dimensional analysis section 5, as shown in FIG. 2. The section 4 extracts a first speech feature parameter of a low order, i.e., a low-dimensional feature parameter from the digital speech signal output from the speech input unit 1. The section 5 extracts a second speech feature parameter of a high order, i.e., a high-dimensional feature parameter from the digital speech signal output from the speech input unit 1.

For example, as shown in FIG. 3, the first analysis section 4 comprises an 8-channel band-pass filter (BPF) 4a, a square process section 4b, a smoothing section 4c, and a logarithmic conversion section 4d. The output signal of the 8-channel band-pass filter 4a is square-processed by the section 4b, smoothed by the section 4c, and logarithmically compressed by the section 4d, and is thus converted into a low-dimensional feature parameter. Similarly, the analysis section 5 comprises a 16-channel band-pass filter (BPF) 5a, a square process section 5b, a smoothing section 5c, and a logarithmic compression section 5d. The output signal of the 16-channel band-pass filter 5a is square-processed by the section 5b, smoothed by the section 5c, and logarithmically compressed by the section 5d, and is thus converted into a high-dimensional feature parameter.

Figure 4:
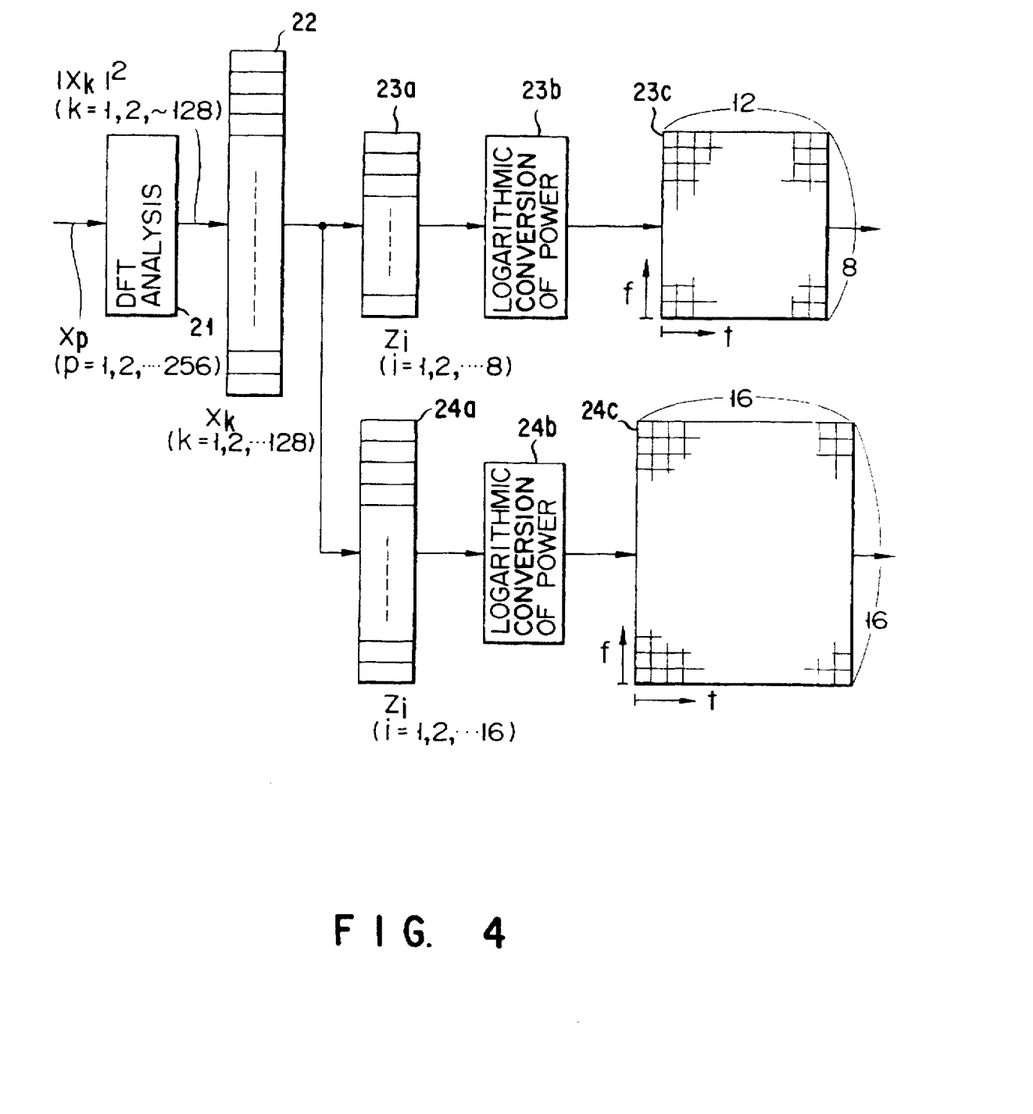
FIG. 4 is a diagram explaining how the low- and high-dimensional word feature vectors are extracted.

The low- and high-dimensional feature parameters can be obtained by frequency analysis known as "Discrete Fourier Transform (DFT) analysis" as will be explained with reference to FIG. 4. An analysis section 21 of the speech analysis unit 2 performs, for example, DFT analysis on the input digital speech signal. More specifically, as is shown in FIG. 4, 256-dimensional DFT is performed by sampling the input speech signal at a frequency of 12 kHz, thereby obtaining a frequency spectrum $X_k$ (DFT spectrum) of 128-point resolution which is supplied to a filter 22. The power $X_k^2$ of this spectrum $X_k$ is smoothed along the frequency axis, thereby to obtain outputs $Z_i$ equivalent to those of an 8-channel filter bank 23a or 16-channel filter bank 24a (($i=1, 2, \ldots 8$ for 8-channel and $i=1, 2, \ldots 16$ for 16-channel).

In the low-dimensional analysis section 4, to obtain the outputs $Z_i$ equivalent to those of an 8-channel filter bank 23b ($i=1, 2, \ldots 8$), the power of the spectrum $X_k$ is smoothed along the frequency axis as follows:

$$Z_1 = \sum_{k=5}^{10} |X_k|^2$$

$$Z_2 = \sum_{k=9}^{15} |X_k|^2$$

$$Z_i = \sum_{k=mi}^{ni} |X_k|^2$$

.
.
.

$$Z_8 = \sum_{k=70}^{110} |X_k|^2$$

Then, the logarithmic conversion section 4d of FIG. 3, i.e., 23b of FIG. 4, logarithmically processes the outputs $Z_i$ ($i=1, 2, \ldots 8$) thus determined, to obtain 8-dimensional feature parameter, i.e. low-dimensional feature parameter, which is represented as:

$$G_i = 10 \log Z_i \ (i=1, 2, \ldots 8)$$

Similarly, in the high-dimensional analysis section 5, the power of the spectrum $X_k$ is smoothed to obtain the outputs $Z_i$ corresponding to those of a 16-channel filter bank 24a ($i=1, 2, \ldots 16$), and these outputs $Z_i$ are logarithmically processed by the logarithmic conversion section 24b to obtain a 16-dimensional feature parameter, i.e., a high-dimensional feature parameter, which is represented as:

$G_i=10 \log Z_i$ $(i=1, 2, \ldots 16)$

As is understood from the above, the two types of feature parameters which differ in dimensions from each other are extracted from the same frequency spectrum (i.e., the DFT spectrum). Extracting the two types of feature parameters is desirable since the resulting amount of data is relatively small. The two types of feature parameters may be obtained by a different DFT analysis, an LPC analysis, or a cepstrum analysis.

The feature parameters of the first type are approximate feature parameters obtained by a global spectrum analysis and being robust against noise, whereas those of the second type are detail feature parameters obtained by a detail spectrum analysis and representing detail word features.

As described above, the speech analysis unit 2 extracts low- and high-dimensional feature parameters from the input digital speech signal. Both types of parameters are processed in the speech pattern recognition unit 3, wherein the low-dimensional feature parameter is subjected to a word spotting and the high-dimensional feature parameter is recognized on the basis of fixed word boundaries.

The speech pattern recognition unit 3 comprises a first recognition section, i.e., a word spotting section for performing speech pattern recognition (i.e., a word spotting method) using non-fixed word boundaries, and a second recognition section, i.e., a fixed word boundary recognition section for performing speech pattern recognition using fixed word boundaries. In other words, the word spotting section subjects the low-dimensional feature parameter to a word spotting, to extract a plurality of word feature vectors therefrom without fixing word boundaries. The extracted word feature vectors are matched with the reference speech patterns to obtain candidates of approximate word feature vectors, i.e., approximate word feature vector candidates each of which has a maximum similarity for each word class. The fixed word boundary recognition section determines word boundaries from the approximate word feature vector candidates. Using these fixed word boundaries, detail word feature vectors are defined and extracted from the high-dimensional feature parameter, and matched with the reference patterns.

Figure 5:
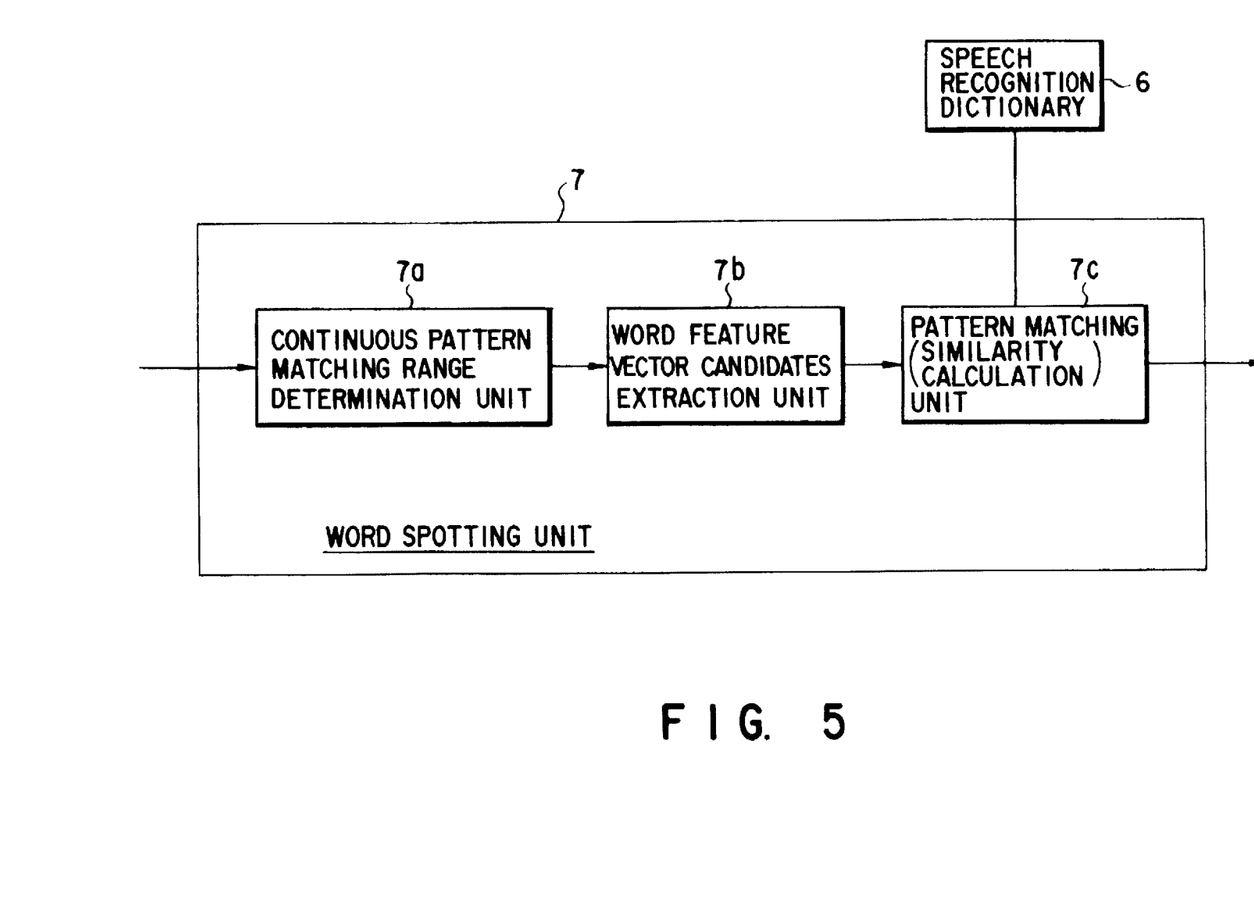
FIG. 5 is a block diagram showing the word spotting unit shown in FIG. 2.

For example, the first recognition section comprises a continuous pattern matching section i.e., a word spotting section 7 comprising a continuous pattern matching range determination unit 7a, a candidate word feature vector extraction unit 7b, and a pattern matching (similarity calculation) unit 7c as shown in FIG. 5. The continuous pattern matching range determination unit 7a determines a range for matching, and the candidate word feature vector extraction unit 7b extracts a plurality of word feature vector candidates from the low-dimensional speech parameters represented by the filter bank output within the range determined by the unit 7a, without fixing word boundaries.

Figure 6:
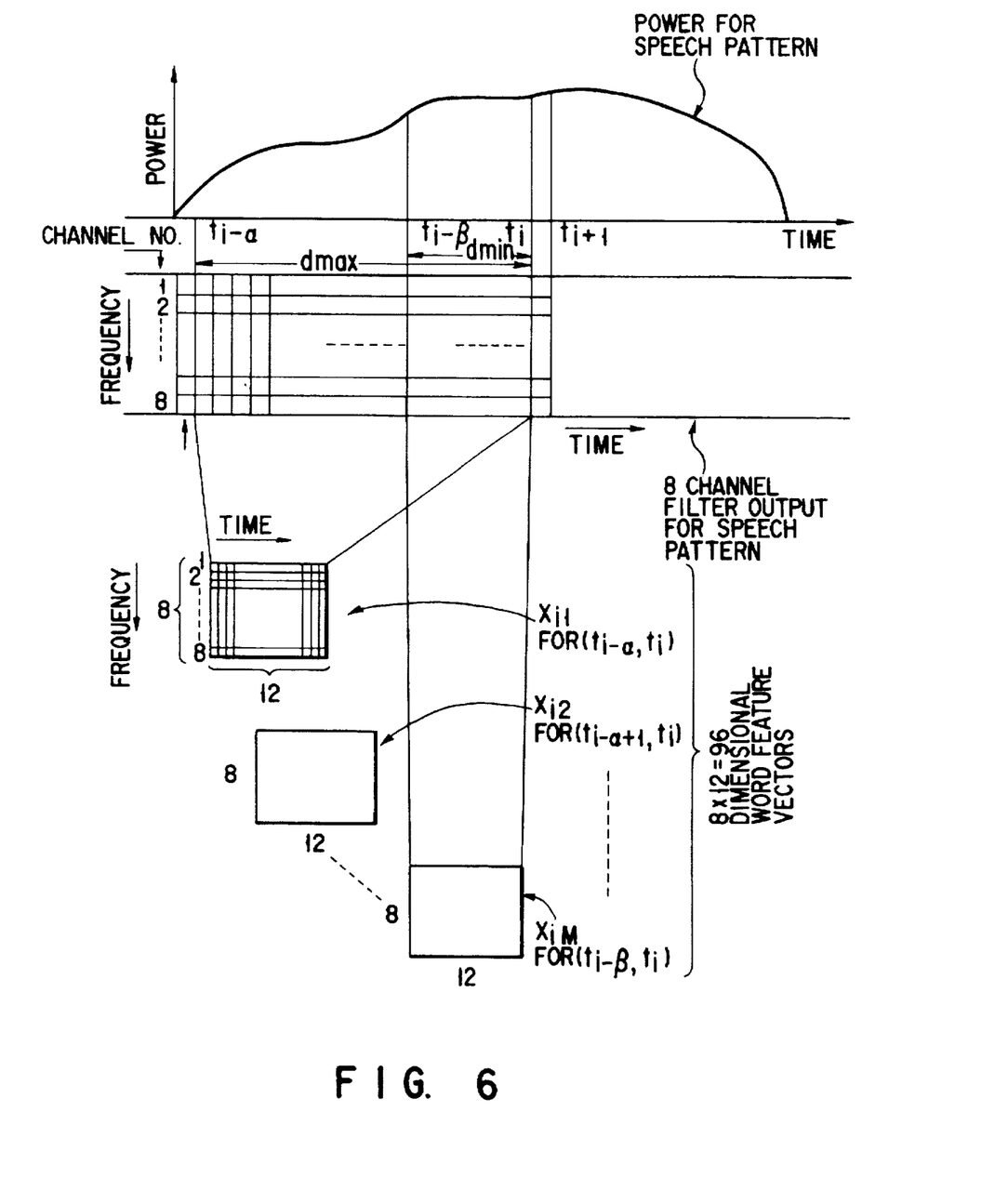
FIGS. 6 and 7 are diagrams explaining how a word spotting method is performed.

Referring to FIG. 6, the word spotting processing performed by the word spotting section 7 will now be explained in detail.

During pattern matching between each of approximate word feature vectors and the reference patterns, an end point candidate is assumed for each analysis frame such as 8 ms. A series of start point candidates corresponding to the end point candidate are determined based on the maximum and minimum durations (dmax and dmin). A plurality of word feature vectors, e.g. M word feature vectors $X_{i1}, X_{i2}, \ldots, X_{iM}$, are extracted from the low-dimensional feature parameter with each point (M points in total) between a time $t_{i-\alpha}$ and a time $t_{i-\beta}$ taken as one of the start point candidates. In other words, each word feature vector $X_{ij}$ (j=1, 2, ..., M) is obtained by sampling 8-channel time series signal at 12 points along the time axis, so that each word feature vector $X_{ij}$ is given as a 8 (channels)×12 (sampling points)=96-dimensional vector quantity. Thus, M word feature vectors are extracted for each time $t_i$, as the time $t_i$ progresses along the time axis.

Then, the similarity values, representing degrees of matching between the reference patterns in the speech pattern recognition dictionary 6 and each extracted word feature vector $X_{ij}$, are calculated. As a measure of the similarity, a statistical distance measure such as a Multiple Similarity may be used. With the Multiple Similarity, a Similarity value between a reference pattern (word l) in the speech pattern recognition dictionary 6 and each word feature vector $X_{ij}$ is given by the following expression:

$$S_{ij}^{(l)} = \sum_{m=1}^{M} am^{(l)}(X_{ij}, \Phi m^{(l)})^2$$

where am (l) is an eigenvalue for the word l, and $\Phi m^{(l)}$ is an eigenvector for the word (l).

As described above, the section 7 performs pattern matching the low-dimensional word feature vectors with the reference patterns stored in the dictionary 6 on the basis of the word spotting method. More precisely, the section 7 extracts from the time series signal without fixing word boundaries, a plurality of time-series data, i.e., word feature vectors, each of which is a (8-by-12)-dimensional vector based on 8 channels on the frequency axis and the 12 sampling points on the time axis. Then, the section 7 matches the word feature vectors with the reference patterns stored in the first dictionary section of the dictionary 6 to obtain approximate word feature vector candidates, each having the maximum similarity.

It will be explained hereinafter how the section 7 performs pattern matching between the word feature vectors and the reference patterns stored in the first dictionary section of the speech pattern recognition dictionary 6.

Figure 7:
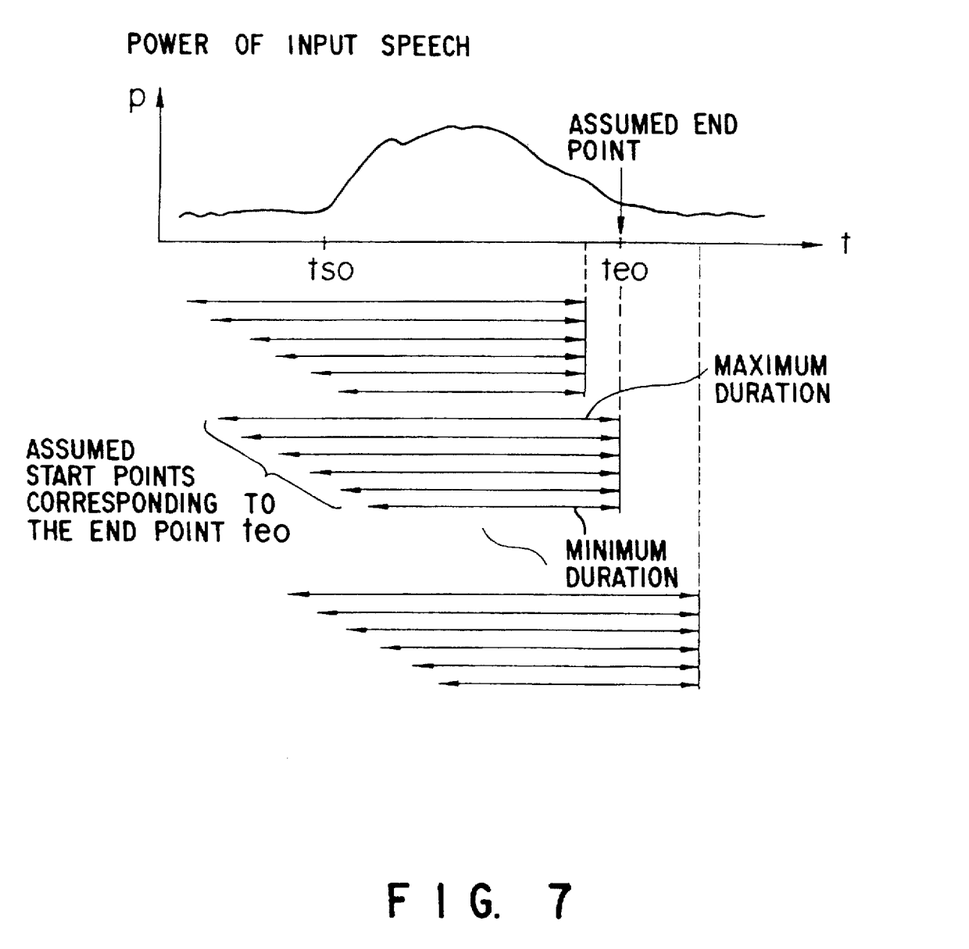

First, a sampling point, at which the low-dimensional feature parameter input from the first analysis section 4 is sampled, is assumed as an end point candidate of each of the word feature vectors for each analysis frame. Next, a series of start point candidates corresponding to the end point candidate are determined based on the predetermined maximum and minimum durations (dmax and dmin) for each word class. Then, the low-dimensional feature parameter is sampled along the time axis for each of the periods defined by the start point candidates and the end point candidates to obtain a plurality of word feature vectors as shown in FIG. 6. The word feature vectors are extracted while the end point is shifted along the time axis for each frame as shown in FIG. 7.

The word feature vectors obtained as described above are matched with the reference patterns stored in the first section of the speech pattern recognition dictionary 6. Thus, the similarity between each of the word feature vectors and the reference patterns is calculated on the basis of, for example, the Multiple Similarity method.

Thereafter, the similarities between the word feature vectors and the reference patterns are compared with one another, and the reference pattern corresponding to the maximum similarity is produced as an output corresponding to a recognition result for each word class, i.e., a candidate of approximate word feature vector (word feature vector candidate), to the recognition-result processing unit 11.

The word spotting performed by the word spotting section 7 is free of the prior-mentioned problem of erroneous detection of word feature vectors, and therefore, helps to enhance the speech pattern recognition accuracy of the system. In the word spotting method, however, it is necessary to continuously extract the word feature vectors from the time series signal, and determine the similarities between the word feature vectors and the reference patterns stored in the first section of the dictionary 6. To achieve the extraction of the word feature vectors and the determination of similarities, a great amount of computation must be performed. In order to reduce the amount of computation, thereby rendering the speech pattern recognition practical, the dimension of the word feature vectors has to be decreased. If the dimension of the word feature vectors is greatly decreased, the approximate word features of the input speech pattern insufficiently represented and can no longer be recognized. It is, however, possible to correctly recognize the detail word features of the input speech pattern.

To recognize the detail word features of the input speech pattern, the second recognition section incorporated in the speech pattern recognition unit 3 extracts high-dimensional word feature vectors (detail word feature vectors) representing the detail word features of the input speech pattern from the high-dimensional feature parameter output from the second analysis section 5, and matched the high-dimensional word feature vectors with the word reference vectors stored in the second section of the speech pattern recognition dictionary 6. The high-dimensional word feature vectors have their different word boundaries.

The second recognition section, i.e., fixed word boundary recognition section will now be described in detail hereinafter.

As shown in FIG. 2, the fixed word boundary recognition section incorporated in the speech pattern recognition unit 3 comprises a start and end points detecting section 8, a feature vector extracting section 9, and a speech pattern matching section 10.

The start and end points detecting section 8 detects the start and end points of the word feature vector candidate corresponding to the maximum similarity determined by the word spotting section 7. More specifically, the start and end points detecting section 8 detects the start and end points of the word feature vector candidate, either by determining the changes in the energy of the input speech pattern or by performing continuous DP matching method. Hence, detection of the start and end points can be achieved independently of the word spotting section 7.

The detail word feature vector extracting section 9 samples the second feature parameter, i.e., the high-dimensional parameter from the second analysis section 5, within a range defined by the word feature vector candidates' start and end points which are detected by the start and end points detecting section 8, in order to extract detail word feature vectors from the high-dimensional parameter. This sampling is performed at 16 sampling points along the time axis, so each detail word feature vector is a 16 (channels)×16 (sampling points)=256 dimensional vector quantity as shown in FIG. 4. The detail word feature vectors, thus obtained, are fed as input into the pattern matching section 10. The section 10 matches each of the detail word feature vectors from the detail word feature vector extracting section 9 with the word reference vectors stored in the second section of the speech pattern recognition dictionary 6.

The pattern matching section 10 calculates the similarity values between the word reference vectors stored in the speech pattern recognition dictionary 6 and each of the detail word feature vectors extracted by the detail word feature vector extracting section 9 on the basis of the Multiple Similarity method. The pattern matching section 10 may employ different similarity or distance measures on the basis of the HMM method or the DP matching method. More specifically, the section 10 receives the detail word feature vectors extracted from the high-dimensional feature parameter and defined by the start and end points detected by the start and end points detecting section 8, and matches each of the detail word feature vectors with the word reference vectors stored in the second section of the speech pattern recognition dictionary 6. Of the various word reference vectors the word reference vector which is most similar to the detail word feature vector is used as a recognition result.

In summary, the following operations are performed in the speech pattern recognition unit 3. Firstly, the approximate word feature vector candidates are extracted from the low-dimensional feature parameter by the word spotting method without fixing word boundaries. Secondly, the start point $t_{sa}$ and end point $t_{ea}$ of each of the word feature vector candidates are detected. Next, the detail word feature vectors are extracted from the high-dimensional feature parameter in accordance with the detected start and end points of each of the approximate word feature vector candidates with fixed word boundaries. Finally, each of the detail word feature vectors is matched with the word reference vectors to obtain a recognition candidate.

More specifically, the speech pattern recognition unit 3 performs not only time-continuous pattern matching each of the low-dimensional word feature vectors (patterns each having variable word boundaries, namely non-fixed word boundaries) with the reference patterns stored in the first section of the speech pattern recognition dictionary 6 to obtain approximate word feature vector candidates, but also detects the start and end points of each word feature vector candidate. Subsequently, unit 3 extracts the detail word feature vectors from the high-dimensional feature parameter in accordance with the detected start and end points and matches each of the detail word feature vectors with the word reference vectors stored in the second section of the dictionary 6. The results of the speech pattern recognition thus performed in the speech pattern recognition unit 3, i.e., the recognition candidates, are then supplied to the recognition result processing unit 11.

As shown in FIG. 2, the recognition-result processing unit 11 comprises a first processing section 12, a second processing section 13, and a third processing section 14. The first processing section 12 receives the similarities obtained by the word spotting section 7. The second processing section 13 receives the word candidates obtained by the pattern matching section 10. The third processing section 14 evaluates the similarities obtained by the section 12 and the word candidates from the section 13 and then produces the final recognition results as described hereinafter.

The final recognition results produced by the third processing section are supplied through the recognition result output unit 15 to a data-processing apparatus (not shown) or a display.

It will now be explained how the third processing section 14 evaluates the similarities and the word candidates obtained by the first processing section 12 and the second processing sections 13, respectively.

Let us assume that the word spotting section 7 of the speech pattern recognition unit 3 extracts three recognition classes C1, C2, and C3 having the three highest similarities. The recognition class names are supplied to the first processing section 12 along with the similarities $S_{C1}$, $S_{C2}$, and $S_{C3}$ (hereinafter referred to as "first similarities"). At the same time, the data items representing the start and end points of the low-dimensional word feature vector candidates which define the first similarities $S_{C1}$, $S_{C2}$, and $S_{C3}$ are supplied to the high-dimensional speech pattern recognition section (including the sections 8, 9, and 10) and used therein to extract high-dimensional word feature vectors from the high-dimensional feature parameter with fixed word boundaries.

The high-dimensional speech pattern recognition section matches the high-dimensional word feature vectors of the recognition classes C1, C2, and C3 with the reference patterns to obtain similarities $S_{C1'}$, $S_{C2'}$, and $S_{C3'}$ (hereinafter referred to as "second similarities"), and transfers the second similarities to the second processing section 13.

In the recognition-result processing unit 11, the third processing section 14 adds the first similarities $S_{C1}$, $S_{C2}$, and $S_{C3}$ output from the first processing section 12 to the respective second similarities $S_{C1'}$, $S_{C2'}$, and $S_{C3'}$ output from the second processing section 13, as indicated by the following equation:

$$TS_{Ci} = S_{Ci} + S_{Ci'} \quad (i=1, 2, 3)$$

In other words, the third processing section 14 combines the first and second similarities $S_{Ci}$ and $S_{Ci'}$ of each recognition class Ci to obtain a combined similarity $TS_{Ci}$. Then, the third processing section 14 compares the combined similarities $TS_{C1}$, $TS_{C2}$, and $TS_{C3}$ with one another, and determines the highest combined similarity among the combined similarities. The word feature vector having the highest combined similarity is supplied, as the final recognition result, through the recognition result output unit 15 to the data-processing apparatus or the display.

Instead of merely adding the first similarities obtained by the first speech pattern recognition, i.e., the low-dimensional word feature vector recognition to the second similarities obtained by the second speech pattern recognition, i.e., the high-dimensional word feature vector recognition, a weighting coefficient w (0<w<1) can be applied to the first similarity $S_{Ci}$ and the second similarity $S_{Ci'}$, so that the combined similarity $TS_{Ci}$ is obtained as a weighted mean of the two, as indicated by the following equation:

$$TS_{Ci} = wS_{Ci} + (1-w)S_{Ci'} \quad (i=1, 2, 3)$$

Preferably, w=approx. 0.2, so that the first and second similarities, which are the results of the pattern matching using the high-dimensional word feature vectors representing the detail features of each word pattern of the input speech pattern, are appropriately weighted.

Further, the second similarities $S_{C1'}$, $S_{C2'}$, and $S_{C3'}$ obtained for the recognition classes C1, C2, and C3, can be compared to determine whether or not the first highest similarity and the second highest similarity differ very much. If the difference between these similarities is too great, the speech pattern recognition can be performed based only on the second similarities $S_{C1'}$, $S_{C2'}$, and $S_{C3'}$ without the first similarities $S_{C1}$, $S_{C2}$, and $S_{C3}$. If the difference is relatively small, the speech pattern recognition is performed based on both sets of similarities, i.e., the first similarities $S_{C1}$, $S_{C2}$, and $S_{C3}$, and the second similarities $S_{C1'}$, $S_{C2'}$, and $S_{C3'}$.

Alternatively, the similarities of either similarity set can be converted to probability values (likelihood values), and the greatest probability values can be used as the final result of speech pattern recognition. Another method is to statistically analyze the distribution of the first similarities $S_{C1}$, $S_{C2}$, and $S_{C3}$ and that of the second similarities $S_{C1'}$, $S_{C2'}$, and $S_{C3'}$, to determine the highest similarity which will be used as the final result of speech pattern recognition.

As previously described, the recognition-result processing unit 11 processes the similarities output by the speech pattern recognition unit 3, thereby obtaining the final recognition results.

Figure 8:
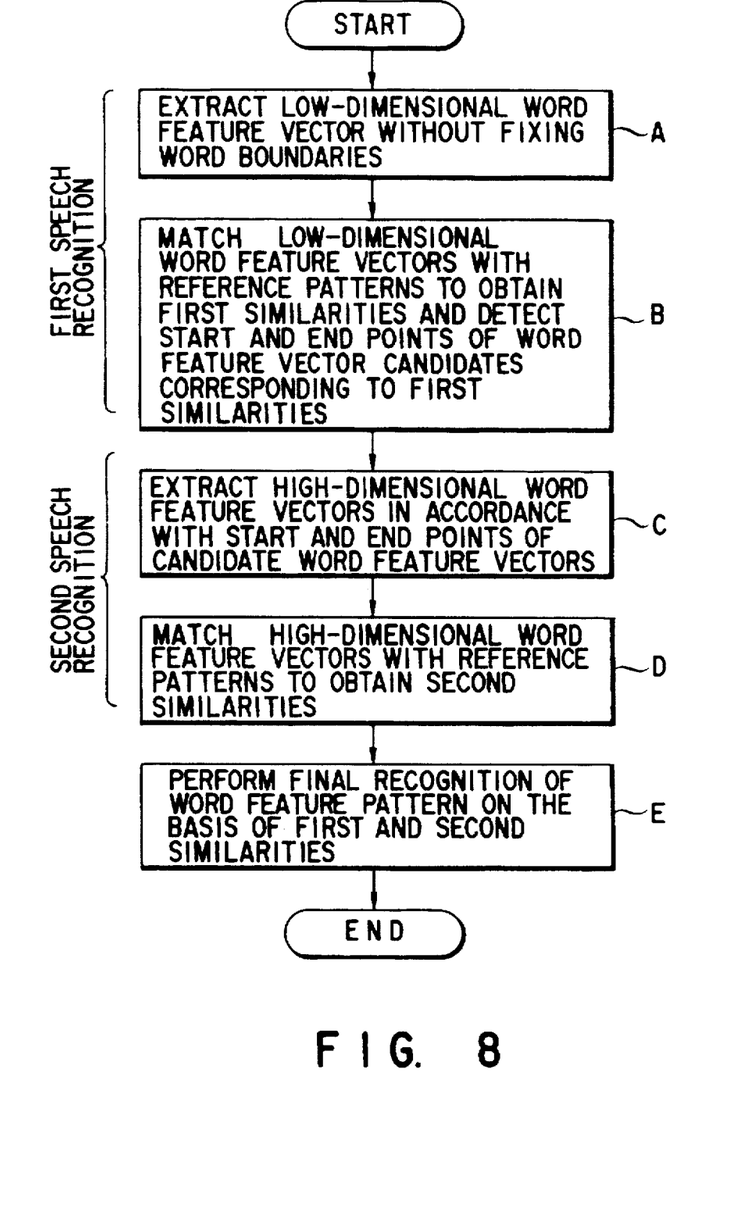
FIG. 8 is a flow chart explaining how the system shown in FIG. 2 carries out speech pattern recognition.

The operation of the speech pattern recognition system shown in FIG. 2 will now be explained, with reference to the flow chart of FIG. 8.

First, in step A, the low-dimensional word feature vectors are extracted, without fixing the word boundaries, from the time-series data representing the low-dimensional feature parameter output from the first analysis section 4 of the speech analysis unit 2. In step B, the low-dimensional word feature vectors are matched with the reference patterns stored in the first section of the speech pattern recognition dictionary 6 to obtain the first similarities for determining the word feature vector candidates. The start and end points of each word feature vector candidate are then detected. In other words, the word feature vector candidates are extracted from the low-dimensional feature parameter input by the word spotting method, and the start and end points of each of the word feature vector candidates are determined.

In step C, the high-dimensional word feature vectors are extracted from the high-dimensional feature parameter output from the second analysis section 5 of the speech analysis unit 2 in accordance with the start and end points of each of the word feature vector candidates. In other words, the high-dimensional word feature vectors are extracted with fixed word boundaries. In step D, the high-dimensional word feature vectors are matched with the word reference vectors stored in the second section of the speech pattern recognition dictionary to obtain the second similarities. In step E, the final recognition of the high-dimensional word feature vectors are performed in accordance with the first and second similarities.

As described above, the speech pattern recognition system of the present invention recognizes the input speech in three steps. In other words, in the first step, the low-dimensional feature parameter is subjected to the time-continuous pattern matching, i.e., the word spotting recognition to obtain low-dimensional word feature vectors representing approximate word features. In the second step, high-dimensional word feature vectors are extracted from the high-dimensional feature parameter in accordance with the start and end points of each of the low-dimensional word feature vector candidates, and matched with the reference patterns to determine the detail word feature pattern. In the third step, the final recognition is performed on the basis of the approximate and detail word feature vector candidates.

Figure 9A:
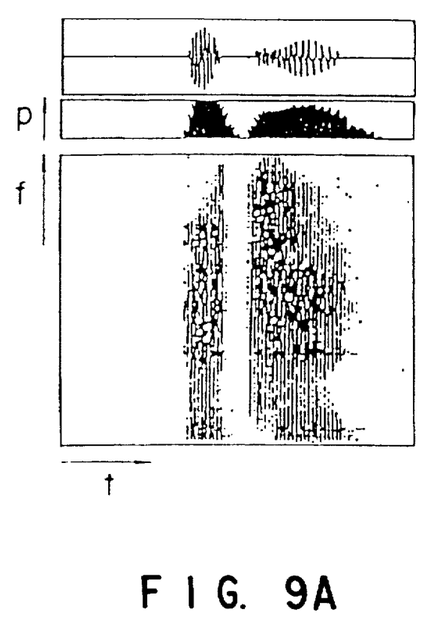
FIGS. 9A and 9B are diagrams illustrating the clean and noisy input speech patterns, and explaining how the system shown in FIG. 2 recognizes the input speech patterns.
Figure 9B:
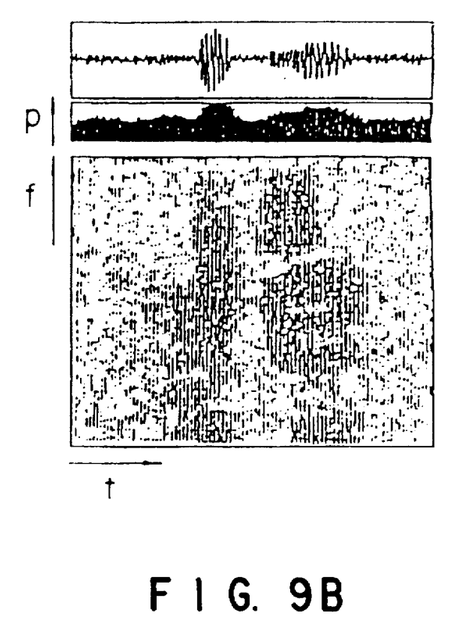

The recognition result obtained in the first step is generally robust against the noise, if any, contained in the input speech, since the word feature vector candidates are extracted from the low-dimensional feature parameter. The recognition result obtained in the second step represents the detail word feature, because the detail word feature vectors are extracted from the high-dimensional feature parameter. Since each of the word feature patterns is recognized based on the two recognition results obtained in the first and second speech pattern recognitions, the final recognition result is very accurate. More specifically, even if the input feature parameter shown in FIG. 9A is, so to speak, buried in noise as is illustrated in FIG. 9B, it can be recognized with high accuracy.

Figure 10:
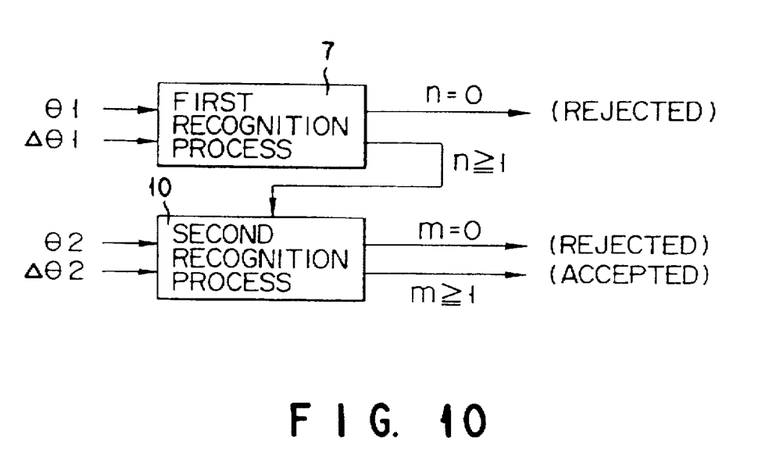
FIG. 10 is a diagram schematically showing another speech pattern recognition process which the system shown in FIG. 2 can perform.

According to the invention, the first and second recognition processes can be performed in a specific way as will be explained with reference to FIG. 10. In the first recognition process, the word feature vectors having similarities greater than the threshold value θ1, and the difference between each of the similarities and the maximum similarity being not more than a predetermined value Δθ1, are accepted as word feature vector candidates, whereas the word feature vectors not satisfying the above conditions are rejected. The acceptable word feature vector candidates are matched with the reference patterns in the second recognition process. The acceptable word feature vector candidates having similarities greater than the threshold value θ2, the difference between each of the similarities and the maximum similarity being not more than a predetermined value Δθ2, are accepted as recognition word feature vectors, whereas the others are rejected. This method rejects semantically insignificant word feature vectors, and therefore, can greatly help to impart a practical value to the speech pattern recognition system.

As explained above, the high-dimensional word feature vectors are extracted from the high-dimensional feature parameter in accordance with the start and end points data indicating the start and end points of each of the low-dimensional word feature vector candidates extracted by the word spotting method. However, the start and end point data do not always correctly represent the start and end points of the word feature vector candidate of the input speech pattern. In order to recognize the word feature vector accurately, it is necessary to detect several points close to the start point and also several points close to the end point. The word feature vectors defined by these start and end points are then determined and matched with the word reference vectors in the pattern matching section 10. More specifically, since several point candidates for the start and end points of each word feature vector candidate are detected, the similarity between the recognition candidate and the reference patterns is increased. The high-dimensional word feature vectors defined by the start and end point candidates can then be obtained and matched with the word reference vectors in the pattern matching section 10.

Figure 11:
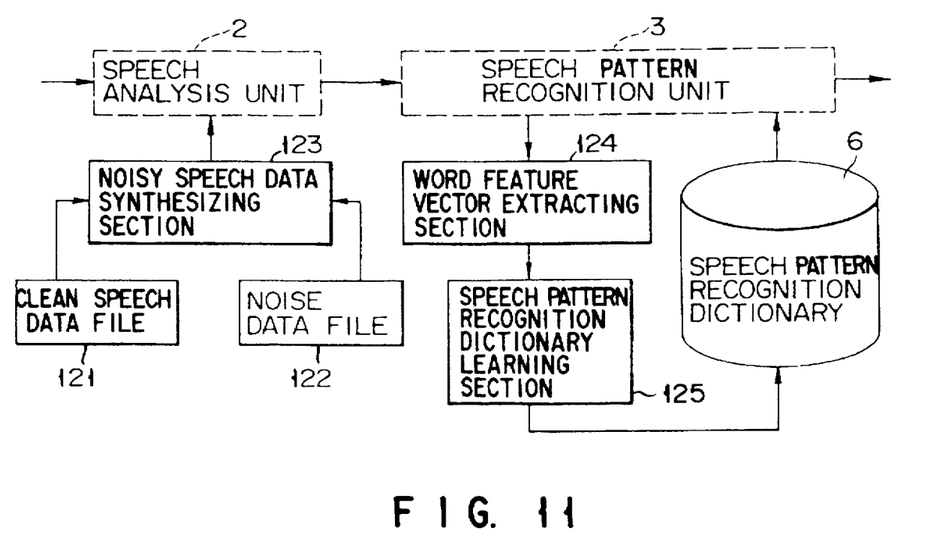
FIG. 11 is a block diagram showing a unit for performing a reference pattern learning process.

Although not shown in FIG. 1, the speech pattern recognition system further comprises a reference pattern learning unit for modifying the reference patterns stored in the speech pattern recognition dictionary 6. As is schematically shown in FIG. 11, the reference pattern learning unit comprises a clean speech data file 121, a noise data file 122, a noisy speech data synthesizing section 123, a word feature vector extracting section 124, and a reference pattern recognition dictionary learning section 125.

The clean speech data file 121 stores clean speech data for learning, i.e., word feature vectors contained in a speech in a noise free environment. The noise data file 122 stores noise data for learning, i.e., noise data representing noises in noisy environments such as streets, stations, offices, and the like.

The noisy speech synthesizing section 123 mixes the clean speech data and the noise data to artificially obtain noisy speech data for learning, or more specifically, reads the speech data from the clean speech data file 121 and the noise data from the noise data file 122, and then superposes the noise data on the clean speech data to obtain noisy speech data for learning. The noisy speech data is supplied from the noisy speech data synthesizing section 123 to the speech analysis unit 2.

The speech analysis unit 2 analyzes the noisy speech data output from the noisy speech data synthesizing section 123 and feeds the low- and high-dimensional feature parameters to the speech pattern recognition unit 3.

The continuous pattern-matching section (word spotting section) 7 of the speech pattern recognition unit 3, processes the low-dimensional feature parameter to extract low-dimensional word feature vectors therefrom without fixing the word boundaries. The extracted word feature vectors are matched with the reference patterns stored in the speech pattern recognition dictionary 6 to determine the recognition result. The word feature vectors corresponding to the similarity value of the recognition result are supplied as word feature vector candidates to the word feature vector extracting section 124.

The word feature vector extracting section 124 receives the word feature vector candidates from the word spotting section 7 of the speech pattern recognition unit 3. Then, the word feature vector extracting section 124 detects any first similarity $S_{ij}$ which differs from the maximum similarity, $\max S_{ij}$, by a predetermined value θ or less, and also determines the start point $t_s$ and end point $t_e$ of the word feature vector candidate $X_{ij}$ corresponding to the first similarity $S_{ij}$. The points $t_s$ and $t_e$ of the word feature vector candidate $X_{ij}$ and the first similarity $S_{ij}$ will be used to extract a feature vector for the purpose of learning speech patterns.

Figure 12:
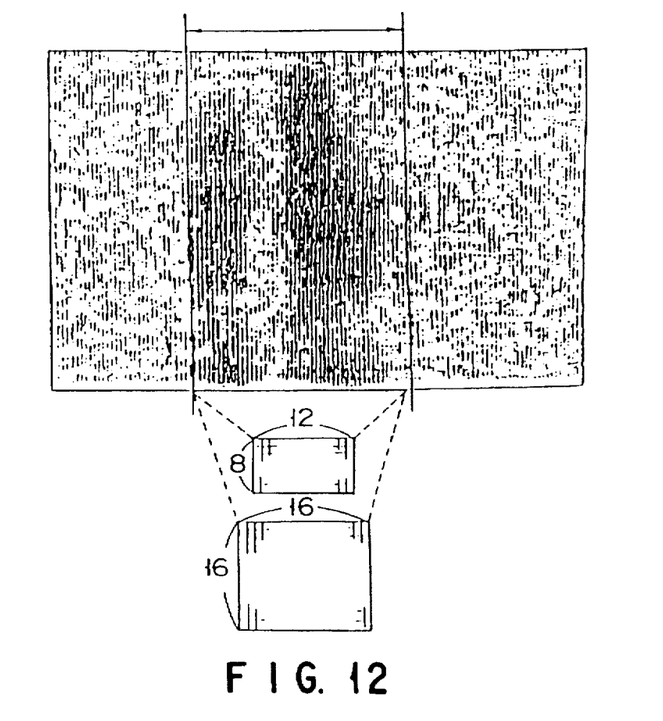
FIG. 12 is a schematic representation of word feature vectors extracted from a time series signal and used for reference pattern learning purpose.

Hence, the feature vector extracting section 124 detects the points $t_s$ and $t_e$ of the word feature vector candidate $X_{ij}$, and extracts an approximate word feature vector, i.e., an 8×12-dimensional word feature vector, from the low-dimensional feature parameter, and a detail word feature vector, i.e., a 16×16-dimensional word feature vector, from the high-dimensional parameter, in accordance with the start and end points $t_s$ and $t_e$ as shown in FIG. 12.

The reference vector recognition dictionary learning section 125 prepares new word reference vectors based on the approximate and detail word feature vectors thus determined for every word feature vector of the input speech. The data representing the new word reference vectors are supplied to the speech pattern recognition dictionary 6, thereby updating the word reference vectors stored therein.

More specifically, when the pattern matching section 10 performs the multiple similarity method, the learning process on the dictionary 6 is accomplished in the following manner. First, the covariance matrix of the reference patterns is updated in accordance with the word feature vectors $X_{ij}$ extracted by the word feature vector extracting section 124. Next, the covariance matrix is subjected to KL transform (expansion), thereby determining an eigenvalue λ and an eigenvector φ, which are specific to the covariance matrix. The eigenvalue λ and the eigenvector φ are stored into the dictionary 6 to update the contents thereof. This completes one cycle of the learning process.

Figure 13:
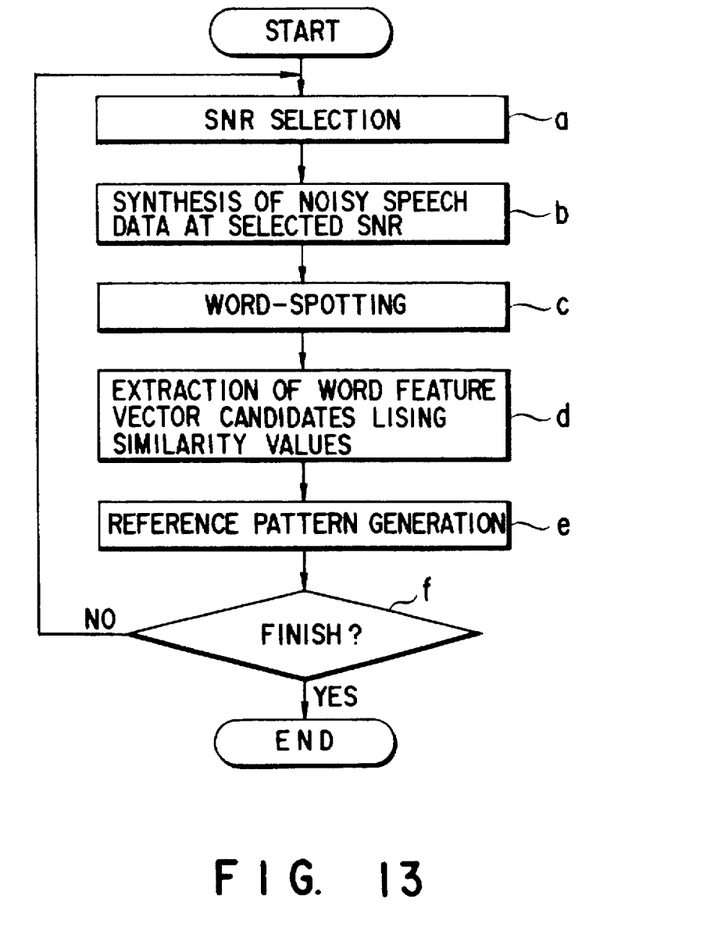
FIG. 13 is a flow chart explaining the reference pattern learning process performed by the unit of FIG. 11.

The learning process will be explained in detail with reference to the flow chart shown in FIG. 13.

First, in step a, a Signal-to-Noise Ratio (SNR) is selected which is the ratio of the speech data to the noise data. In step b, the noise data is superposed on the pure speech data to the degree determined by the SNR, which is varied and reduced in successive iterations by gradually increasing noise levels, thereby forming noisy speech data. In step c, the word spotting is performed to extract word feature vectors from the low-dimensional feature parameter without fixing the word boundaries. Each of the extracted word feature vectors is matched with the reference patterns stored in the first section of the speech pattern recognition dictionary 6 to obtain word feature vector candidates.

Subsequently, the feature vector extracting section 124 detects any first similarity $S_{ij}$ which differs from the maximum similarity $\max S_{ij}$ by a predetermined value θ or less, and also determines the start and end points $t_s$ and $t_e$ of each of the word feature vector candidates $X_{ij}$ corresponding to the first similarity $S_{ij}$. In most cases, not one set but several sets of start and end points may be detected for one word feature vector, depending on the value θ.

In the method of extracting feature vectors, which has also been invented by the present inventors and is disclosed in Japanese Patent Application No. 1-57978, the word feature vector candidate for learning is extracted from the word feature vectors obtained by the word spotting, with consideration of the maximum similarity $S_{max}$.

By contrast, in the present invention, a plurality of sets of start and end points are detected from the word feature vector candidates obtained by the word spotting. The start and end points, which are most similar to the reference start and end points already determined for each recognition class, are selected among the detected start and end points as start and end point candidates having high reliability.

A plurality of sets of start and end point candidates, which have been detected from the word feature vector candidates obtained by the word spotting, define the detail word feature vectors of the input speech. The detail word feature vectors are examined to determine whether they have time ranges falling within a predetermined range which is more than the minimum time range (e.g., the minimum duration dmin in FIG. 6) of the word feature vector but less than the maximum time range (e.g., the maximum duration dmax in FIG. 6) thereof. The word feature vectors falling within that range will be used as more detailed word feature vectors. Furthermore, the detail word feature vector with the time range most similar to that of the reference pattern already determined for the recognition class is selected.

The word feature vectors can be examined during the word spotting to see whether they have time ranges falling within the predetermined range. In other words, similarities may be obtained for only those word feature vectors having time ranges within the predetermined range. If this is the case, it will then not be necessary, at the time of extracting the word feature vectors, to examine the word feature vectors defined by the start and end points to determine whether they have time ranges falling within the predetermined range.

During the examination for the time ranges of the word feature vectors, the start and end point candidates for each word feature vector are examined to see whether they are located within an allowable time range. The start and end points located outside the allowable time range are rejected, and those located within the allowable time range are accepted. The word feature vector candidates defined by the accepted start and end points are examined to determine whether they have time ranges falling within the predetermined range. Only the word feature vector candidates having time ranges falling within the predetermined range are accepted as detail word feature vector candidates. One detail word feature vector candidate having the time range nearest to that of each of the word reference vectors already determined for the recognition class is selected among the word feature vector candidates.

Next, in step d, the approximate and detail word feature vector candidates are extracted from the low- and high-dimensional feature parameters as shown in FIG. 12. The approximate and detail word feature vector candidates, thus extracted, are accurate and reliable since they are robust against noise.

Further, in step e, the reference pattern for each recognition class stored in the dictionary 6 is updated in accordance with the low- and high-dimensional word feature vector candidates extracted in step d. Hence, the speech pattern recognition dictionary 6 is modified to improve the performance of the speech pattern recognition system.

In step f, it is determined whether the contents of the dictionary 6 have been updated for all recognition classes. If NO, the sequence of dictionary learning process, described above, is reiterated until it is confirmed that the contents of the dictionary 6 have been updated for all recognition classes.

The learning process performed on the dictionary 6 renders the reference patterns immune to noise, and may be called "noise immunity learning." The reference pattern learning unit (FIG. 11) superposes noise data on speech data, thus forming data representing new reference patterns. This data modifies the reference patterns stored in the dictionary 6. The reference vectors, thus modified, are used to perform word spotting in the low-dimensional speech pattern recognition section, and word pattern matching in the high-dimensional speech pattern recognition section. In other words, the data formed by the reference pattern learning unit renders the dictionary 6 more efficient and more reliable. Further, each word feature vector, which is accurately extracted in accordance with the start and end points of each of the word feature vector candidates detected by the word spotting, modifies the corresponding reference pattern stored in the dictionary 6, thus also making the dictionary 6 more efficient.

The present invention is not limited to the embodiment described above. For example, the feature vectors can be phonemes or syllables, instead of words as in the above embodiment. Further, recognition classes can be phrases, composite words, sentences, or other segments, instead of words as in the above embodiment. Moreover, the dimension of the feature vectors used in the speech pattern recognition process and the method of pattern matching need not be limited to those employed in the embodiment described above. The speech pattern recognition system according to the invention is a hybrid system performing both word spotting and word pattern matching, and can be modified in various ways within the scope of the present invention.

What is claimed is:

1. A speech recognition system comprising:

speech analysis means for analyzing input speech, said speech analysis means including a first analysis section for extracting a low-dimensional feature parameter from the input speech and a second analysis section for extracting a high-dimensional feature parameter of a higher order than that of the low-dimensional feature parameter therefrom;

means for storing a first recognition dictionary containing reference patterns;

first speech recognition means for continuously extracting first word feature vectors from the low-dimensional feature parameter obtained by said speech analysis means in accordance with a word-spotting method, without fixing word boundaries, and correlating the first word feature vectors with the reference patterns in the first recognition dictionary to obtain first recognition results;

segmentation means for detecting start and end points of each of the first word feature vectors;

feature vector extracting means for extracting second word feature vectors from the high-dimensional feature parameter in accordance with the detected start and end points;

second speech recognition means for correlating the second word feature vectors with reference patterns of a second recognition dictionary, stored in the storing means to obtain second recognition results; and recognition-result processing means for obtaining final speech recognition results from the first and second recognition results.

2. A system according to claim 1, in which the first speech recognition means includes means for correlating the first feature vectors with the reference patterns stored in said first recognition dictionary by means of a word spotting method, to obtain the time-series data of first similarities.

3. A system according to claim 1, in which the first and second speech recognition means calculate, in the same way, the similarities between each of the feature vectors and the reference patterns, to correlate the feature vectors with the reference patterns.

4. A speech recognition system according to claim 1, further comprising speech pattern learning means for updating contents of said first and second recognition dictionaries.

5. A system according to claim 4, in which the speech pattern learning means includes means for processing speech data representing the input speech, and forming modified speech data, means for detecting start and end points for the segments of the input speech, in accordance with time-series data of similarities which have been obtained through the word spotting method performed by said first speech recognition means, means for analyzing the modified speech data to obtain time-series data of feature parameters, and means for extracting the low-dimensional and high-dimensional feature parameters in accordance with the start and end points.

6. A system according to claim 5, in which the speech pattern learning means includes means for adding noise to the speech data, to modify the speech data.

7. A method of recognizing an input speech, comprising:

analyzing input speech to obtain independently a low-dimensional feature parameter of the input speech and a high-dimensional feature parameter of a higher order than that of the low-dimensional feature parameter thereof;

obtaining first word feature vectors from the low-dimensional feature parameter obtained by said speech analysis means in accordance with a word-spotting method, without fixing word boundaries, and correlating the first word feature vectors with reference patterns stored in a first recognition dictionary to obtain first recognition results;

detecting start and end points of each of the first word feature vectors;

extracting second word feature vectors from the high-dimensional parameter in accordance with the detected start and end points;

correlating the extracted second feature vectors with reference patterns stored in a second recognition dictionary, to obtain second recognition results; and obtaining final recognition results from the first and second recognition results.

8. A method according to claim 7, in which the second step includes a step of correlating the first feature vectors with the reference patterns stored in the first recognition dictionary by means of a word spotting method, to obtain the time-series data of first similarities.

9. A method according to claim 7, in which the similarities between each of the feature vectors and the reference patterns are calculated in the same way, to correlate the feature vectors with the reference patterns.

10. A method according to claim 7, further comprising updating the contents of said first and second recognition dictionaries.

11. A method according to claim 10, in which the updating includes processing speech data representing the input speech, to form modified speech data, detecting start and end points for the segments of the input speech, in accordance with the time-series data of similarities which have been obtained through the word spotting method performed by said first speech recognition means, analyzing the modified speech data to obtain time-series data of feature parameters, and extracting the first and second feature parameters from the time-series data of feature parameters in accordance with the start and end points.

12. A method according to claim 11, in which the updating includes adding noise to the speech data, to modify the speech data.

* * * * *